United States Patent [19]
Brown

[11] Patent Number: 5,848,627
[45] Date of Patent: *Dec. 15, 1998

[54] ROTOR FOR LAND CLEARING DEVICE

[75] Inventor: Stanley L. Brown, Lenox, Iowa

[73] Assignee: Brown Bear Corporation, Corning, Iowa

[ * ] Notice: The term of this patent shall not extend beyond the expiration date of Pat. No. 5,642,765.

[21] Appl. No.: 795,390

[22] Filed: Feb. 4, 1997

Related U.S. Application Data

[62] Division of Ser. No. 648,623, May 16, 1996, Pat. No. 5,642,765.
[51] Int. Cl.$^6$ .................................................. A01G 23/08
[52] U.S. Cl. ........................ 144/34.1; 144/241; 144/336; 56/294; 241/101.74
[58] Field of Search .................................... 144/4.1, 34.1, 144/24.13, 218, 241, 334, 336; 56/10.1, 29, 233, 234, 235, 239, 294; 241/193, 194, 101.74, 293

[56] References Cited

U.S. PATENT DOCUMENTS

| | | | |
|---|---|---|---|
| 3,177,640 | 4/1965 | Mott, Jr. | 56/294 |
| 3,604,188 | 9/1971 | Mott | 56/294 |
| 4,000,859 | 1/1977 | Whitney | 241/194 |
| 4,082,231 | 4/1978 | Gould | 241/194 |
| 4,283,904 | 8/1981 | Aron | 56/293 |
| 5,377,919 | 1/1995 | Rogers et al. | 241/296 |
| 5,513,485 | 5/1996 | Hashimoto et al. | 144/34.1 |
| 5,642,765 | 7/1997 | Brown | 144/34.1 |

Primary Examiner—W. Donald Bray
Attorney, Agent, or Firm—Zarley, McKee, Thomte, Voorhees & Sease

[57] ABSTRACT

A rator for a land clearing device or forestry shredder which comprises a plurality of anchors spaced apart, offset, and arranged on a horizontal cylinder. Cutting elements are mounted between adjacent anchors, the anchors arranged such that there are no gaps between the effective areas of the cutting elements as the rotator spins. The anchors can also be arranged so that at least one cutting element is located at or near the cutting element area at all times.

10 Claims, 4 Drawing Sheets

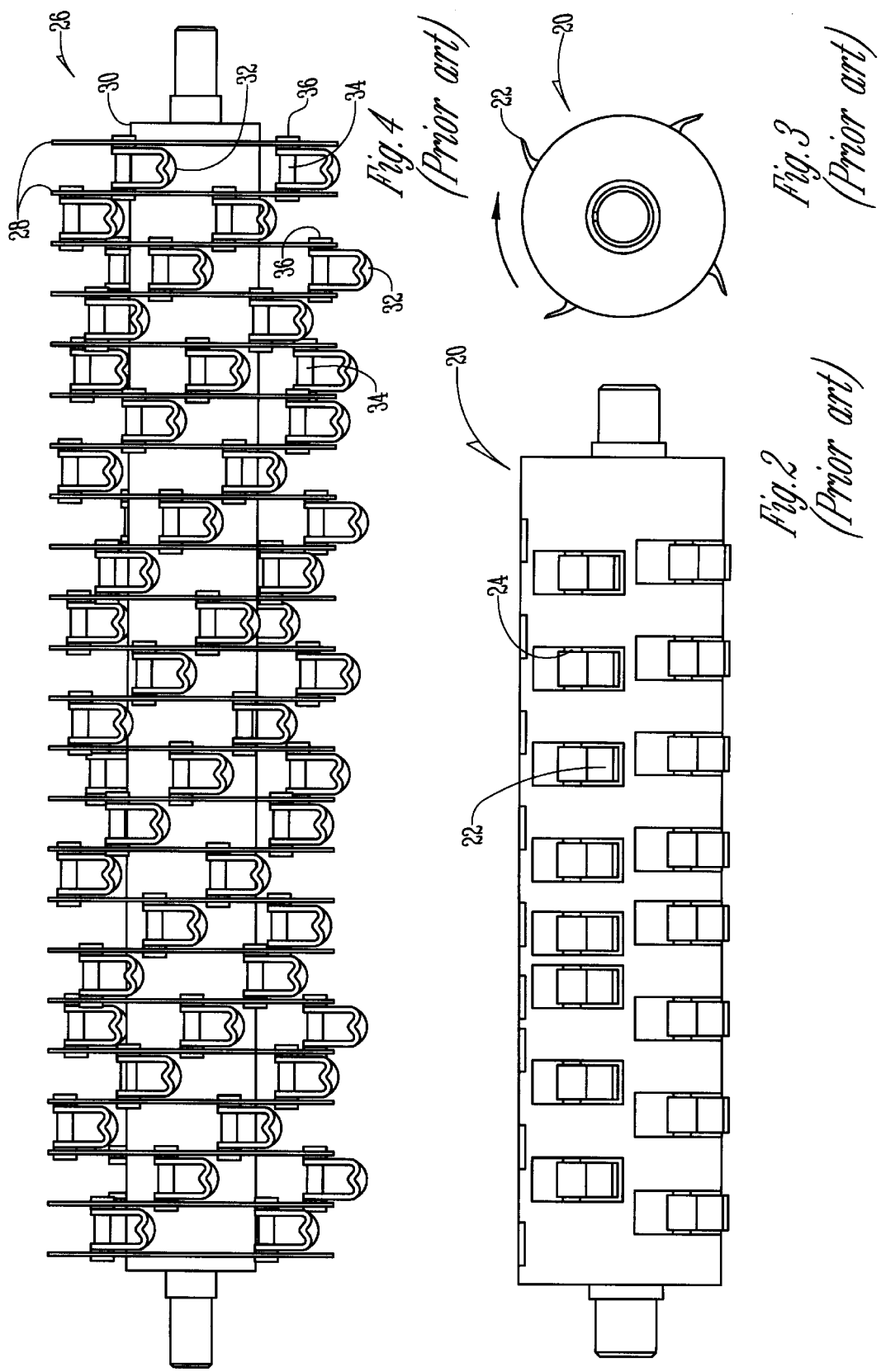

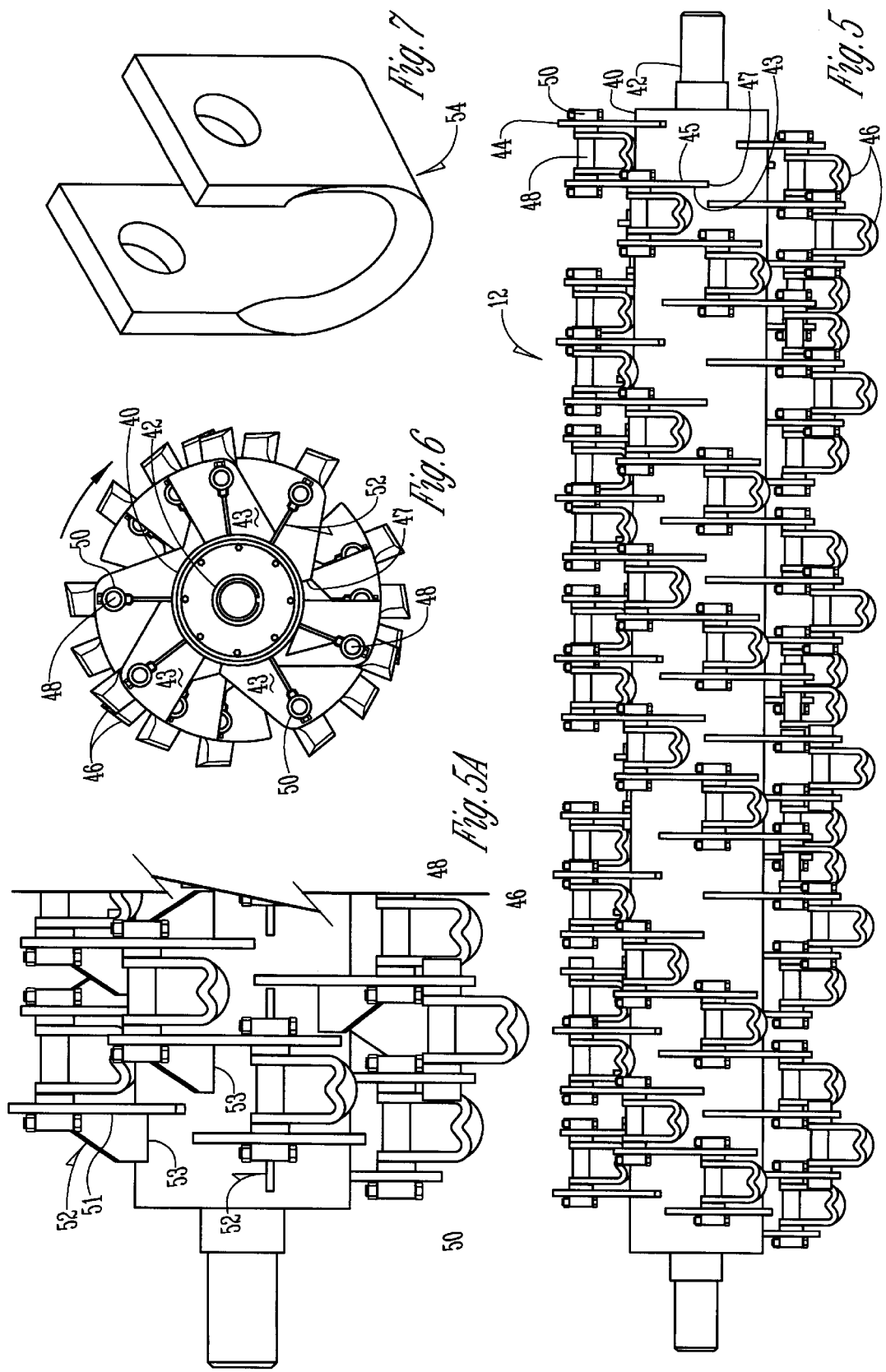

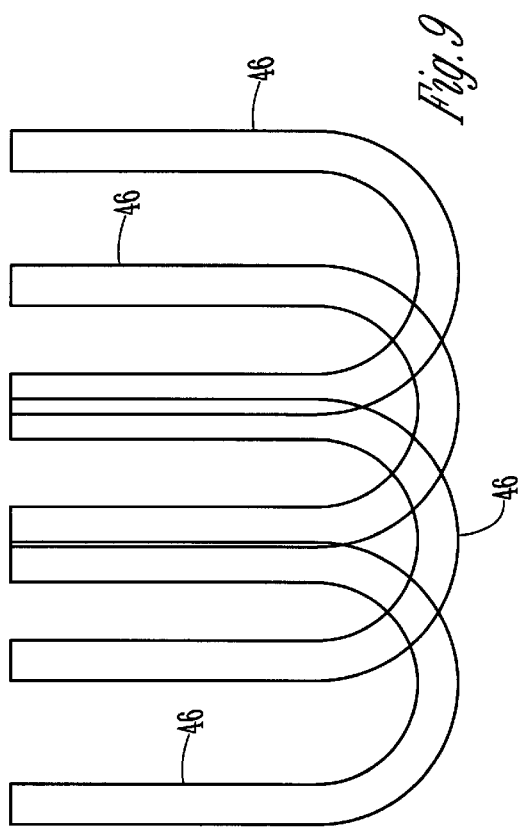
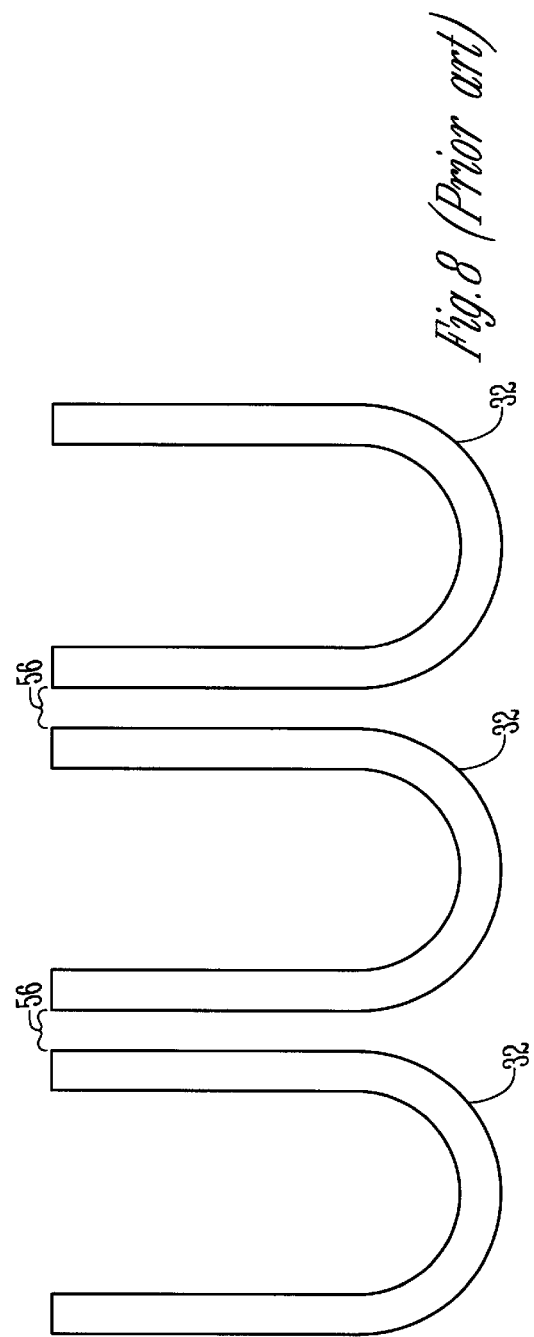

ROTOR FOR LAND CLEARING DEVICE

This is a divisional of application Ser. No. 08/648,623 filed on May 16, 1996, U.S. Pat. No. 5,642,765.

BACKGROUND OF THE INVENTION

The present invention relates to a rotor for cutting and, in particular, to a rotor for cutting and clearing such things as brush, debris and small-diameter trees.

Land clearing devices, also referred to as forestry shredders, are used to clear such things as utility and pipe line right-of-ways, fire lanes, construction and development sites, and recreational sites. Many prior art forestry shredders have a plurality of knives, teeth or other cutting elements hingeably mounted near the periphery of a horizontal rotor. In response to the rotation of the rotor, the cutting elements engage and cut through the tree or other woody debris. The shredded material is then discharged and left to mulch to retard erosion and decompose. Typically, the rotor is mounted on and driven by a heavy-duty full-time four-wheel drive tractor.

When the forestry shredder is cutting through light brush, it is not essential that the cutting elements be aligned such that there are no gaps between their effective cutting areas. But when larger objects such as large diameter trees and stumps are shredded, even small gaps between the cutting areas of the cutting elements can create problems. For example, if the cutting elements are mounted between circular disks, the disks will rub against the uncut areas of the tree. Thus, there is a need in the art for a rotor assembly that has no gaps between the cutting areas of the cutting elements.

Several prior art shredders have attempted to remove such gaps in their cut by mounting several cutting elements on a single pin and then overlapping the cutting elements on different pins such that there are no gaps as the rotor spins about its axis (see FIG. 2). Mounting several cutting elements on one pin, however, presents several problems. If, for example, a cutting element is broken or damaged toward the middle of the rotor, several other cutting elements must be removed before the cutting element can be replaced. This is a time consuming and expensive process. Further, when several cutting elements rotate about a single pin, there are several worn out or rough spots on the pin, making it difficult to remove and insert the pin. In addition, when all the cutting elements in a single row strike at once, this produces an impulse to the drive line. Because each of the pins spans substantially the entire length of the rotor, the cutting elements cannot be offset such that at least one cutting element is in the cutting area at all times (see FIG. 3). Instead, all the cutting elements of a single row strike at once and then there is a gap before the cutting elements of the next row strike. Therefore, there is also a need in the art for a rotor that allows for easy removal and replacement of the cutting elements and solves the impulse problem.

It is therefore the principal objective of the present invention to provide a rotor for cutting and clearing land which improves upon or solves the problems and deficiencies existing in the art.

Another objective of the invention is to provide a rotor that has no gaps between the cutting areas across the face of the rotor.

A further objective of the present invention is to provide a rotor having at least one cutting element at or near the cutting area.

A still further objective of the present invention is to provide a rotor for clearing land that allows for the easy removal and replacement of cutting elements.

A further object of the present invention is to provide a rotor for clearing land that is efficient in operation, economical to manufacture, and durable in use.

These and other features, objects, and advantages should become apparent to those skilled in the art with reference to the accompanying specification.

SUMMARY OF THE INVENTION

The foregoing objectives are achieved, in the preferred embodiment of the invention, by a rotor assembly comprising a cylinder, a plurality of anchors mounted to and extending from the cylinder, and a plurality of cutting elements each mounted between the sides of adjacent anchors. The anchors are spaced apart and offset on the cylinder such that no gaps exist between the effective cutting areas of the cutting elements. This preferred embodiment eliminates any gaps in the cutting area across the face of the rotor. Further, because several cutting elements are not mounted on a single pin spanning the length of the rotor, the operator can easily remove the pins and independently change the cutting elements.

BRIEF DESCRIPTION OF THE DRAWINGS

FIG. 2 is a front elevational view of a prior art rotor.

FIG. 3 is a side elevational view of the prior art rotor of FIG. 3.

FIG. 4 is a front elevational view of another prior art rotor.

FIG. 5 is a front elevational view of the rotor of the present invention.

FIG. 5A is an enlarged partial view of FIG. 5 showing the placement and arrangement of the support members.

FIG. 6 is a side elevational view of the rotor of FIG. 5.

FIG. 7 is a perspective view of a cutting element of the present invention.

FIG. 8 is a side elevational view of several cutting elements of the prior art rotor of FIG. 4 showing the gaps between their effective cutting areas.

FIG. 9 is a view similar to FIG. 8 showing the overlap between effective cutting areas of the rotor of the present invention.

DETAILED DESCRIPTION OF THE PREFERRED EMBODIMENT

Figure 1:
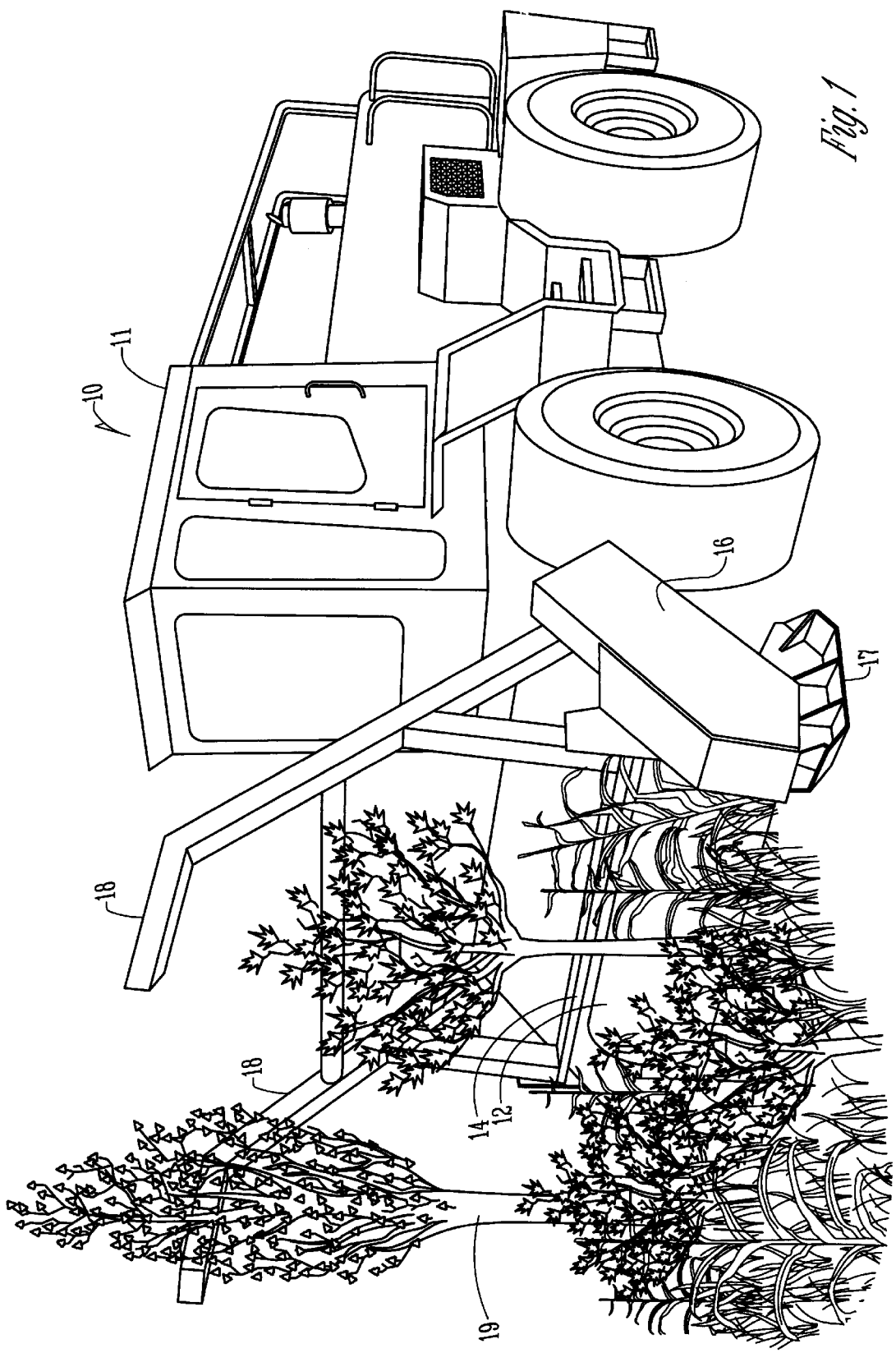
FIG. 1 is a perspective view of a tractor cutting through trees, grass and debris equipped with a rotor of the present invention.

FIG. 1 shows a forestry shredder 10 comprising a heavy-duty full time four-wheel drive tractor 11 equipped with a preferred embodiment of the rotor assembly 12 of the present invention. The rotor assembly 12 is mounted within a rotor housing 14 having a left side 16 and a right side (not shown). Supporting rails 17 are mounted below both sides of the rotor housing 14 and ride at or near the ground to insure that the rotor assembly 12 remains in an appropriate position above the ground. Alignment bars 18 enable the operator of the forestry shredder 10 to see the width of the cutting area. The alignment bars 18 also help to feed brush and small diameter trees 19 into the cutting area of the rotor assembly 12.

FIG. 2 shows a prior art rotor 20. A plurality of teeth 22 are mounted on a single pin 24. The teeth 22 are then offset on different pins 24 so that no gaps exist between the effective cutting areas of the teeth 22 as the rotor 20 completes its rotation. Although the prior art rotor 20 has the advantage of eliminating the gaps in the cutting areas across the face of the rotor 20, mounting several teeth 22 on a single pin 24 presents significant problems. It is difficult to remove a worn tooth 22 near the middle of the rotor 20 because many other teeth 22 on the pin 24 must first be removed. Further, the pin 24 becomes worn from contact with the teeth 22 which makes removal and insertion of the pin 24 more difficult. Furthermore, because the pins 24 span substantially the entire length of the rotor 20, the teeth 22 cannot be offset such that one cutting element is at or near the cutting area at all times (see FIG. 3).

FIG. 4 illustrates another prior art rotor 26. Circular discs 28 are welded to a cylinder 30. Cutting elements 32 are hingeably mounted on pins 34 between adjacent discs 28. The pins 34 are typically held in place by the discs 28 using cap screws 36. This prior art design is advantageous in that one cutting element 32 can be positioned at or near the cutting area at all times thus eliminating the impulse problems at the drive line. The prior art rotor 26 solves the impulse problem because the cutting elements 32 can be closely offset without the mounting pins 34 interfering with the rotation of the cutting elements 32. Centrifugal force in the spinning rotor 26 holds the cutting elements 32 out in the cutting position. If material cannot be cut, then the hingeably mounted cutting element 32 rotates back inside the disc 28 for protection. Centrifugal force then repositions the cutting element 32 immediately after passing the obstacle. This prior art rotor 26 suffers, however, in that there are gaps between the effective cutting areas of the cutting elements 32 caused by the discs 28. This is problematic when cutting small-diameter trees and stumps as the discs 28 will rub against the uncut areas of the tree or stump.

The deficiencies described in the prior art rotors 20 and 26 are solved by the rotor assembly 12 of the present invention, As shown in FIG. 5, a cylinder 40 is mounted horizontally on a shaft 42. A plurality of anchors 44 each having a first side 43, a second side 45, and a bottom edge 47 are arranged along the periphery of the cylinder 40. The first and second sides (43, 45) of adjacent anchors 44 are facing. Although the cylinder 40 can be made from a variety of different materials, it is preferred that the cylinder 40 be comprised of a machine cold drawn torque steel. It is also preferred that the anchors 44 be made from a high tensile steel with the bottom edges 47 of the anchors 44 being welded to the cylinder 40. As shown in FIG. 5A, support members 52 are mounted substantially orthogonal to the anchors 44 to provide additional support. Each side support 52 has a side edge 51 welded to either the first edge 43 or the second edge 45 of the anchor 44, and a bottom edge 53 welded to the cylinder 40. Similar to the prior art rotor 26 of FIG. 4, a plurality of cutting elements 46 are mounted individually between the facing sides of adjacent anchors 44. Each cutting element 46 is hingeably mounted between the anchors on pins 48 that are retained by cap screws 50. Preferably, the cutting elements are pinned independently on heat-treated alloy steel pins and retained by grade 8 cap screws. The spinning of the cylinder 40 creates a centrifugal force that holds the cutting elements 46 out in the cutting position. If the material cannot be cut, the cutting element 46 rotates back between the anchors 44 for protection. Centrifugal force then repositions the cutting element 46 immediately after passing the obstacle. As shown in FIG. 6, the anchors 44 of the rotor assembly 12 of the present invention are arranged and offset so that a cutting element 46 is positioned at or near the cutting area at all times, thereby eliminating the impulse problem to the drive system.

The rotor assembly 12 of the present invention improves upon the prior art rotor 26 in that the arrangement of the anchors 44 now eliminates any gaps between the effective cutting areas of the cutting elements 46 as the rotor assembly 12 rotates about the shaft 42.

FIGS. 8 and 9 illustrate one of the improvements of the rotor assembly 12 of the present invention over the prior art rotor 26. As shown in FIG. 9, the cutting elements 32 are positioned such that gaps 56 remain between the cutting elements 32. In contrast, the design of the rotor assembly 12 of the present invention effectively overlaps the cutting areas of the cutting elements 46 thereby eliminating any gaps therebetween (see FIG. 10).

A variety of different stirrup style cutting elements can be used with the rotor assembly 12 of the present invention. A single edge heel relief cutting element 46 is preferred. Double edge heel relief cutting elements 54 which are reversible are also available (see FIG. 7).

A variety of different systems can be used to power the rotor assembly 12. In the preferred embodiment, the internal combustion engine of the tractor drives a variable displacement hydrostatic pump. The variable displacement hydraulic pump is connected in closed circuit with a fixed displacement hydraulic motor. The output from the hydraulic motor in turn drives a chain mechanism or toothed belt that drives the shaft 42 causing the rotor assembly 12 to spin.

In operation, the cutting action of the rotor leaves a mulch of chips on the just-cut surface to decompose and retard erosion. For additional clean up a pass in the opposite direction will further chip and clear any remaining materials. Discharge from the rotor assembly 12 is restricted by the encapsulation of the rotor assembly within the rotor housing 14.

What is claimed is:

1. A rotor assembly for cutting and clearing brush and trees comprising:
   a cylinder;
   a plurality of anchors each having a top edge, a bottom edge, a first side, and a second side, each of said anchors being attached to said cylinder proximate said bottom edges and extending from said cylinder with said first and second sides of adjacent anchors facing each other;
   a plurality of cutting elements each mounted between said first and second sides of adjacent anchors, each of said cutting elements cutting through an effective cutting area as said cylinder rotates; and
   at least a portion of said anchors being spaced apart and offset on said cylinder so that no gaps exist between said effective cutting areas of said cutting elements mounted to said portion of said anchors.

2. The rotor assembly of claim 1 wherein only one of said cutting elements being mounted between each of said first and second sides of said adjacent anchors.

3. The rotor assembly of claim 1 wherein each of said cutting elements being hingeably mounted between said first and second sides of adjacent anchors.

4. The rotor assembly of claim 1 wherein each of said cutting elements being hingeably mounted on one of a plurality of pins, each of said pins being positioned between said first and second sides of adjacent anchors.

5. The rotor assembly of claim 4 wherein only one of said cutting elements being mounted on each of said pins.

6. The rotor assembly of claim 4 wherein each of said cutting elements having a first leg, a second leg adjacent said first leg, and a cutting portion between said first and second legs, said first and second legs each having apertures being aligned to receive said pin.

7. The rotor assembly of claim 4 wherein said cutting element extends radially from said pin following the rotation of said cylinder.

8. The rotor assembly of claim 1 wherein said anchors and said cutting elements being spaced apart and offset so that at least one of said cutting elements at or near said brush and trees as said cylinder rotates.

9. The rotor assembly of claim 1 further comprising a plurality of support members each having a side edge and a bottom edge, said side edge being attached to one of said first and second sides of said anchor and said bottom edge of said support member attached to said cylinder.

10. In a rotor assembly for clearing brush and land having a cylinder, a plurality of anchors each having a top edge, a bottom edge, a first side, and a second side, each of said anchors being attached to said cylinder proximate said bottom edges and extending from said cylinder with said first and second sides of adjacent anchors facing, and a plurality of cutting elements each mounted between said first and second sides of adjacent anchors, each of said cutting elements cutting through an effective cutting area as said cylinder rotates, wherein the improvement comprises:

at least a portion of said anchors being spaced apart and offset on said cylinder so that no gaps exist between said effective cutting areas of said cutting elements.

* * * * *